US008994958B2

(12) United States Patent
Holzapfel

(10) Patent No.: US 8,994,958 B2
(45) Date of Patent: Mar. 31, 2015

(54) OPTICAL POSITION MEASURING INSTRUMENT

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 539 days.

(21) Appl. No.: 13/326,754

(22) Filed: Dec. 15, 2011

(65) Prior Publication Data
US 2012/0154805 A1 Jun. 21, 2012

(30) Foreign Application Priority Data

Dec. 16, 2010 (DE) .......................... 10 2010 063 253

(51) Int. Cl.
  G01B 11/14 (2006.01)
  G01D 5/38 (2006.01)
  G01D 5/347 (2006.01)
(52) U.S. Cl.
  CPC .............. G01D 5/38 (2013.01); G01D 5/34715 (2013.01)
  USPC ........................................................ 356/616
(58) Field of Classification Search
  CPC ................ G01D 5/38; G01D 5/347–5/34723; G01D 5/344–5/345; G03F 7/70725; G03F 9/7026; G01B 11/026; G01B 11/14; G01S 3/782
  USPC .................................................. 356/365, 616
  See application file for complete search history.

(56) References Cited

U.S. PATENT DOCUMENTS

| | | | |
|---|---|---|---|
| 3,822,942 A | 7/1974 | Hock | |
| 4,577,968 A * | 3/1986 | Makosch | ...................... 356/492 |
| 5,283,434 A * | 2/1994 | Ishizuka et al. | ........... 250/237 G |
| 5,436,724 A * | 7/1995 | Ishizuka et al. | ............... 356/488 |
| 5,499,096 A * | 3/1996 | Tamiya | .......................... 356/494 |
| 6,885,457 B1 * | 4/2005 | Michel et al. | ................. 356/499 |
| 6,914,234 B2 | 7/2005 | Yasuda et al. | |
| 7,796,272 B2 | 9/2010 | Holzapfel | |
| 7,907,286 B2 | 3/2011 | Holzapfel | |

(Continued)

FOREIGN PATENT DOCUMENTS

DE     21 27 483 A1   12/1972
DE     10 2011 082 156 A1   6/2012

(Continued)

OTHER PUBLICATIONS

Born, M., et al., "Principles of Optics," Cambridge University Press, 1999, pp. 32 and 33.

*Primary Examiner* — Kara E Geisel
(74) *Attorney, Agent, or Firm* — Brinks Gilson & Lione

(57) ABSTRACT

An optical position measuring instrument including a scanning plate and a scale, wherein the scale and the scanning plate are movable relative to one another. The optical position measuring instrument including a grating and a light source that emits a beam toward the grating, wherein the grating receives the beam and splits the beam into two partial beams with orthogonal polarization states. The optical position measuring instrument including a polarizer being arranged in beam paths of the two partial beams, wherein the polarizer has a structure to generate polarization effects on the two partial beam striking the polarizer that are periodically variable, wherein a polarization period of the periodically variable polarization effects is greater than a graduation period of the grating. The two partial beams being reunified into a resultant beam. A detection unit that receives the resultant beam and generates a plurality of displacement-dependent scanning signals.

15 Claims, 13 Drawing Sheets

(56) References Cited

U.S. PATENT DOCUMENTS

| | | | |
|---|---|---|---|
| 2003/0155489 A1* | 8/2003 | Yasuda et al. | 250/225 |
| 2003/0193017 A1* | 10/2003 | Ishizuka | 250/237 G |
| 2004/0090636 A1* | 5/2004 | Holzapfel et al. | 356/499 |
| 2005/0207013 A1* | 9/2005 | Kanno et al. | 250/216 |
| 2007/0195334 A1* | 8/2007 | Tamiya | 356/616 |
| 2008/0062432 A1* | 3/2008 | Sandig et al. | 356/499 |
| 2008/0282566 A1 | 11/2008 | Holzapfel | |
| 2008/0285058 A1 | 11/2008 | Holzapfel | |
| 2011/0141451 A1* | 6/2011 | Yamaguchi et al. | 356/494 |

FOREIGN PATENT DOCUMENTS

| | | |
|---|---|---|
| WO | WO 2008/138501 A1 | 11/2008 |
| WO | WO 2008/138502 A1 | 11/2008 |

* cited by examiner

Prior Art

Prior Art

Prior Art

Prior Art

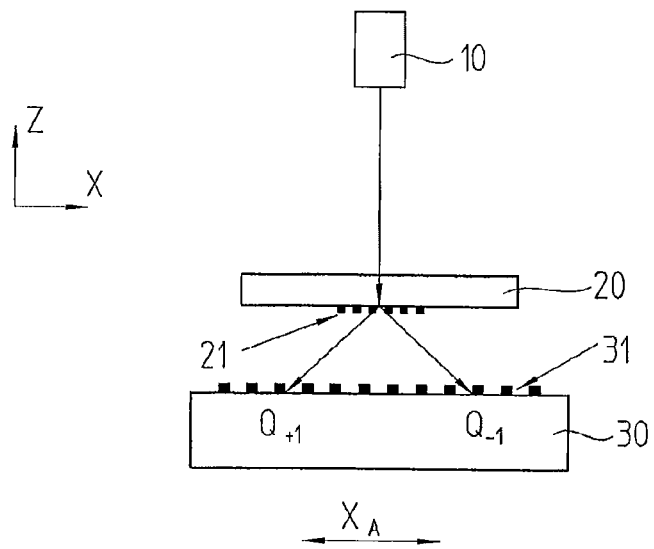
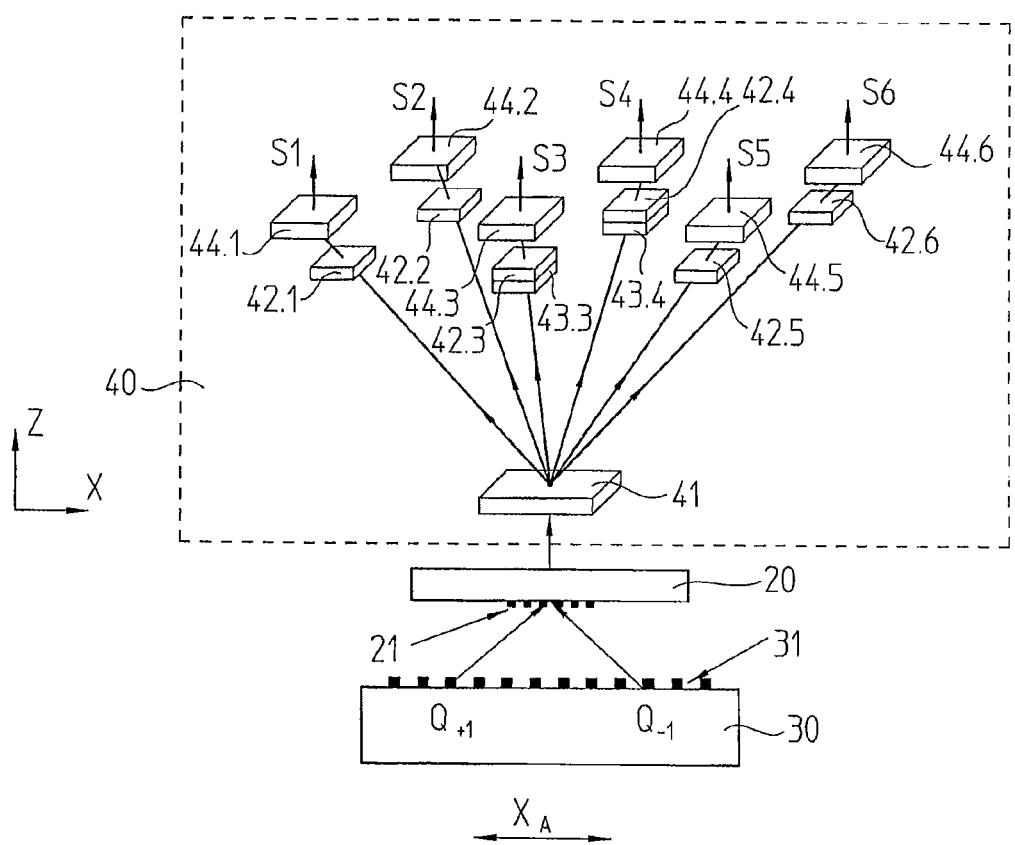

FIG. 10a
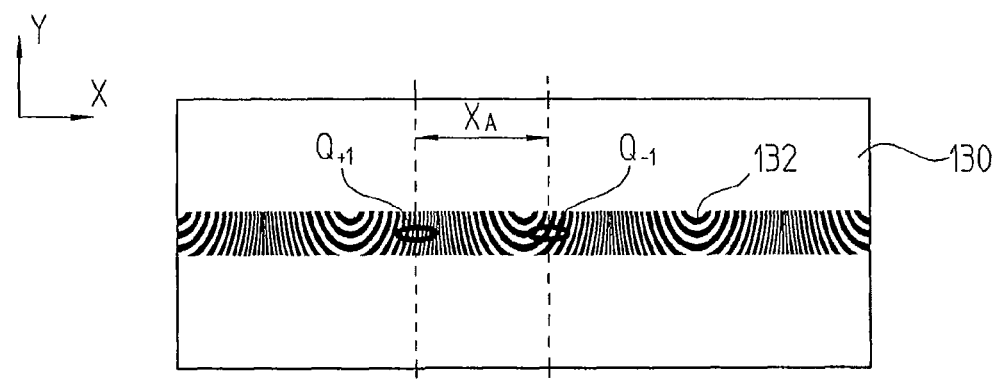
FIb. 10b
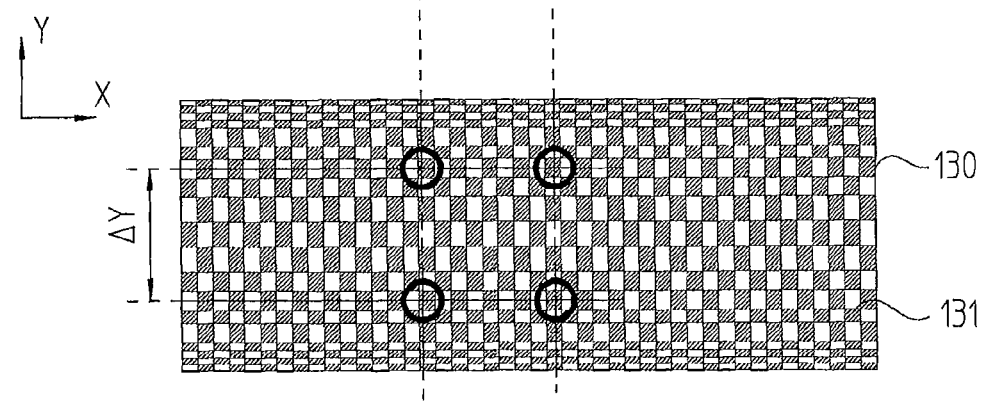

OPTICAL POSITION MEASURING INSTRUMENT

Applicant claims, under 35 U.S.C. §119, the benefit of priority of the filing date of Dec. 16, 2010 of a German patent application, Serial Number 10 2010 063 253.8, filed on the aforementioned date, the entire contents of which is incorporated herein by reference.

BACKGROUND OF THE INVENTION

1. Field of the Invention

The present invention relates to an optical position measuring instrument.

2. Discussion of Related Art

In conventional optical position measuring instruments, which for generating phase-shifted scanning signals use what is known as polarization coding, the two interfering partial beams are polarized perpendicularly to one another. To that end, typically separate polarization-optical components in the scanning unit are disposed in the beam path of the partial beams. The polarization directions of the two partial beams are each fixedly specified, by way of the polarization-optical components disposed in the respective beam paths.

In FIGS. 1a and 1b, the scanning beam path is shown in various views in a first variant of known optical position measuring instruments, which generate phase-shifted scanning signals by means of polarization coding. FIG. 1a shows the scanning beam path as far as the scale M, and FIG. 1b shows the scanning beam path from the scale M onward.

A light source L, for instance a suitable laser light source, emits a beam, linearly polarized at 45° to the X and Y axes, to a scanning plate A with a scanning grating AG. The partial beams, split into the $+1^{st}$ and $-1^{st}$ order of magnitude, propagate in the direction of the scale M, are diffracted by the scale grating MG and reflected back, and polarized perpendicularly to one another by the polarizers P5, P6. After the superposition of the two partial beams by the scanning grating AG, the resultant beam reaches a detection unit D. It includes a polarization-neutral beam splitter BS, a λ/4 retardation plate WP, the polarizing beam splitters PBS1 and PBS2, as well as the linear polarizers P1, . . . , P4 and the associated optoelectronic detector elements PE1-PE4. Because of the polarization-optical components provided in the partial beams, the optoelectronic detector elements PE1, . . . , PE4 detect different polarization states of the resultant beam striking the detection unit D. One such detection unit for optical position measuring instruments is known for instance from FIG. 7 of German Patent Disclosure DE 2127483 A.

For further representation of polarization states in optical position measuring instruments, the so-called Poincaré representation will be used hereinafter, as is shown in FIG. 2. Arbitrary polarization states are represented as a point on the surface of a sphere in an abstract coordinate system X'Y'Z'. The abstract coordinate system X'Y'Z' here has nothing to do with the spatial coordinate system XYZ of the respective position measuring instrument; all the linear polarization states are located in the equatorial plane X'Y'. Along the equator, the polarization axis rotates by 180°. The points PX+ and PX− represent a horizontal and vertical linear polarization state, respectively, and the points PY+ and PY− represent a linear polarization state inclined by +45° and −45°, respectively. The poles PZ+ and PZ− are assigned a left- and right-circular polarization state, respectively. All the orthogonal polarization states are always located at diametrically opposed points. More-detailed information on the Poincaré representation can be found for instance in M. Born, E. Wolf: Principles of Optics, pp. 32, 33, Cambridge University Press, 1999.

In FIG. 2, the polarization states of the known position measuring instrument are shown in FIGS. 1a, 1b on the Poincaré sphere. The polarization states of the two linearly polarized partial beams are represented in this drawing by reference numerals $\Pi_{-1}$ ($-1^{st}$ order of magnitude of the scale M) and $\Pi_{+1}$ ($+1^{st}$ order of magnitude of the scale M). The superposition of the partial beams with these polarization states results in a polarization state $\Pi_0$, which moves along the great circle G in accordance with the relative phase relationship of the partial beams. The plane of the great circle G is perpendicular to the connecting line of the generating polarization states $\Pi_{-1}$ and $\Pi_{+1}$. The polarization states Π1-Π4 detected by the optoelectronic detector elements PE1-PE4 are located on the great circle G, in order to obtain a maximum degree of modulation of the scanning signals. They detect the following polarization states:

PE1: Π1=PY−
PE2: Π2=PY+
PE3: Π3=PZ−
PE4: Π4=PZ+

Maximum signal levels of the resultant scanning signals are always indicated by an optoelectronic detector elements PEn (n=1, . . . , 4) whenever the resultant polarization state $\Pi_0$ coincides with the detector polarization state $\Pi_n$ of the optoelectronic detector element. The signal levels of the scanning signals are correspondingly minimal when the resultant polarization state $\Pi_0$ is located diametrically opposite the detected polarization state $\Pi_n$.

A second variant of known optical position measuring instruments, which generates polarization-coded phase-shifted scanning signals, is shown in FIGS. 3a and 3b. Once again, FIG. 3a shows the scanning beam path as far as the scale M, and FIG. 3b shows the scanning beam path from the scale M on. The two partial beams split by the scanning grating AG are now left- and right-circularly polarized with the aid of λ/4 retardation plates WP1 and WP2 and thus polarized again orthogonally to one another. A suitable detection unit for this variant of optical position measuring instruments is known for instance from FIG. 10 of German Patent Disclosure DE 2127483A.

The associated polarization states are again entered into the Poincaré sphere in FIG. 4 as points $\Pi_{-1}$ and $\Pi_{+1}$. The polarization state $\Pi_0$ resulting from the superposition, here as well, moves along a great circle G as a function of the relative phase relationship. The great circle G is now located in the X'Y' plane, which however is perpendicular to the connecting line of the generating polarization states $\Pi_{-1}$ and $\Pi_{+1}$. The detection unit D in this variant contains a X12 retardation plate WP, which rotates the incident linear polarization $\Pi_0$ by only 45°. Otherwise, the detection unit D is identical to the one in the first variant. The polarization states Π1-Π4 detected by the optoelectronic detector elements PE1-PE4 are:

PE1: Π1=PY−
PE2: Π2=PY+
PE3: Π3=PX−
PE4: Π4=PX+

From U.S. Pat. No. 6,914,234, an optical position measuring instrument is also known, whose scale grating has periodically modulated polarization properties. Within each graduation period of the scale grating, the incident beam is locally linearly polarized, and the polarization direction rotates over the grating period by 180'; accordingly, the polarization period is equivalent to the graduation period of the scale grating. The extent of the scanning beam is selected to be so small that only part of one graduation period of the scale grating is illuminated, so that the exiting beam has a linear polarization whose direction rotates upon a displacement of the scale. The variation of the polarization state of the exiting beam is thus equivalent to the situation shown in FIG. 4. The scanning optics described in U.S. Pat. No. 6,914,234 is thus equivalent to the scanning optics already explained from FIGS. 3a and 3b.

In summary, it can accordingly be stated that in the polarization-coded optical position measuring instruments of the prior art, there are fixed polarization states of the superimposed partial beams, which in the Poincaré representation leads to a stationary great circle G. Phase-shifted scanning signals (3×120°, 4×90°) are generated by optoelectronic detector elements by the detection of polarization states, all of which are located in the plane of the great circle G.

For certain novel scanning optics of optical position measuring instruments, of the kind proposed for instance in German Patent Application DE 102010063216.3 of the present Applicant, there are accordingly limitations. These scanning optics are distinguished in that after a defined displacement or rotation of a component of the optical position measuring instrument, such as the scale or scanning unit, etc., the second partial beam strikes the same point on each optical component of the optical position measuring instrument that the first partial beam struck previously. Such scanning optics of optical position measuring instruments will hereinafter also be called "scanning optics without partial beam association". In such scanning optics without partial beam association, it is not possible, at a defined point in the beam path of the optical position measuring instrument, to dispose polarization-optical components in such a way that it is always only the first or the second partial beam that is affected.

OBJECTS AND SUMMARY OF THE INVENTION

An object of the present invention is an optical position measuring instrument which generates polarization-coded phase-shifted scanning signals and is as simple as possible in its construction.

This object is attained according to the invention by an optical position measuring instrument for detecting the relative position of a scale and a scanning plate. The optical position measuring instrument includes a scanning plate and a scale, wherein the scale and the scanning plate are movable relative to one another in a measuring direction. The optical position measuring instrument including a grating and a light source that emits a beam toward the grating, wherein the grating receives the beam and splits the beam into two partial beams, whose polarization states are oriented orthogonally to one another. The optical position measuring instrument including a polarizer being arranged in beam paths of the two partial beams, wherein the polarizer has a structure to generate polarization effects on the two partial beam striking the polarizer that are periodically variable along degrees of freedom of motion of the scale, wherein a polarization period of the periodically variable polarization effects is greater than a graduation period of the grating. The two partial beams being reunified into a resultant beam. The optical position measuring instrument further including a detection unit that receives the resultant beam and generates a plurality of displacement-dependent scanning signals.

The optical position measuring instrument of the present invention is suitable for detecting the relative position of a scale and a scanning plate, which are disposed movably relative to one another in at least one measuring direction. A beam emitted by a light source, as a result of a first grating, experiences splitting into at least two partial beams, whose polarization states can be oriented orthogonally to one another. Finally, the split partial beams experience a reunification into a resultant beam, and from the resultant beam, a plurality of displacement-dependent scanning signals can be generated in a detection unit. Polarizers, whose polarization effects on the partial beams that strike them are periodically variable along degrees of freedom of the scale, with a polarization period, are disposed in the beam paths of the partial beams. In addition, the polarization period of each polarizer is greater than the graduation period of the first grating.

Advantageously, the detection unit is embodied such that any arbitrary polarization state of the resultant beam can be detected unambiguously in the three directions in space of the Poincaré sphere.

It is possible that the detection unit includes at least three detector elements, and the at least three detector elements detect two linear and one circular polarization state, and the two linear polarization states are not oriented orthogonally to one another.

Preferably, action of the polarizer on each of the partial beams results in linear polarization states in the partial beams, wherein such states vary in their orientation as a function of location.

Advantageously, the polarization states of the two partial beams are always oriented orthogonally to one another.

In one possible embodiment, each polarizer is embodied such that a polarization action, varying as a function of location, on the partial beam striking it is adjustable by way of spatially differently oriented components of the polarizer.

The polarizers can be embodied as high-frequency gratings, which act locally like linear polarizers on the partial beams striking them.

Furthermore, the polarizers can be embodied as high-frequency gratings which act locally like a retardation plate on the partial beams that strike them.

In one embodiment of the optical position measuring instrument of the present invention, the beam emitted by the light source, at a first grating which is embodied as a scanning grating on the scanning plate, experiences splitting into two partial beams. The partial beams then act on a scale grating on the scale and thereupon propagate again in the direction of the scanning grating, where the partial beams are reunified into a resultant beam and delivered to the detection unit.

The scale can be embodied here as a reflection scale, which has a structured dielectric layer and a structured reflector, which are applied to a substrate, and the structured reflector is embodied as a polarizing high-frequency grating.

In a further embodiment of the optical position measuring instrument of the present invention, it is provided that the beam emitted by the light source, at a first grating which is embodied as a scale grating on the scale, experiences splitting into two partial beams;

the partial beams then act on a scanning grating on the scanning plate and thereupon propagate in the direction of a reflector, where a back-reflection of the partial beams in the direction of the scanning grating results; and the partial beams, after the renewed action on the scanning grating, propagate in the direction of the scale grating, where the partial beams are reunified into a resultant beam and delivered to the detection unit.

Here, the reflector can be embodied as a high-frequency grating, whose local grating orientation rotates continuously by 180° over the polarization period.

Alternatively, the reflector can be embodied as a high-frequency grating, whose local grating orientation rotates continuously by 90° over the polarization period.

Preferably, for the ratio of the polarization period of the polarizer to the graduation period of the first grating, the following equation applies:

$$P_P/d_A > 100$$

or $$P_P/d_M > 100,$$

where $P_P$=polarization period of the polarizer,
$d_A$=graduation period of the scanning grating,
$d_M$=graduation period of the scale grating.

It must be noted as an important advantage of a variant of optical position measuring instruments of the present invention that for the polarization-coded generated of the phase-shifted scanning signals, no additional polarization-optical components in the beam path between the scale and the scanning plate are necessary. The polarizers provided according to the present invention can be integrated in various embodiments into already existing components. The result is an especially simple construction of the scanning optics.

Moreover, the scanning optics of the present invention have extremely high stability to temperature fluctuations, when the scale and the scanning plate are made from a material with low thermal expansion. Specifically, there are then no further optical components in the scanning beam path between the splitting into the partial beams until they are reunified. Such components would, because of their thermal expansion behavior or from changes in the thermal index of refraction, affect the phase displacement between the partial beams and would thus cause a thermally dictated drift in position in the resultant scanning signals.

In a further variant of optical position measuring instruments of the present invention, an especially simple beam path course compared to known scanning optics of the prior art proves to be an advantage.

Because of the preferably constant orthogonal polarization of the partial beams, a high degree of modulation of the scanning signals is ensured as well.

Further advantages and details of the present invention will become apparent from the ensuing description of exemplary embodiments in conjunction with the accompanying drawings.

BRIEF DESCRIPTION OF THE DRAWINGS

In the drawings

FIGS. 5a and 5b show various portions of a possible scanning beam path of a first embodiment of the optical position measuring instrument in accordance with the present invention;

FIGS. 10a, 10b show respectively a top view on an embodiment of a reflector and a top view of an embodiment of a scale grating of the scale of the optical position measuring instrument of FIGS. 9a-9c in accordance with the present invention;

DETAILED DESCRIPTION OF THE PREFERRED EMBODIMENTS

Figure 1A:
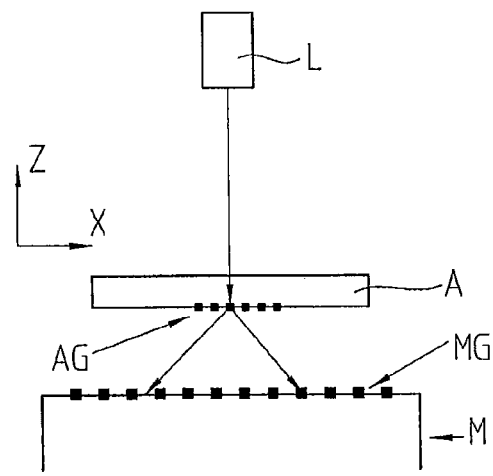
FIGS. 1a and 1b show various portions of the scanning beam path of a first embodiment of an optical position measuring instrument in the prior art.
Figure 1B:
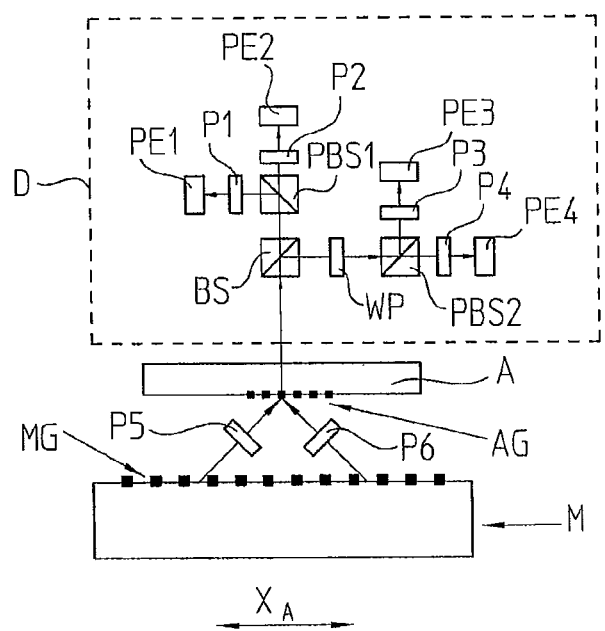
Figure 2:
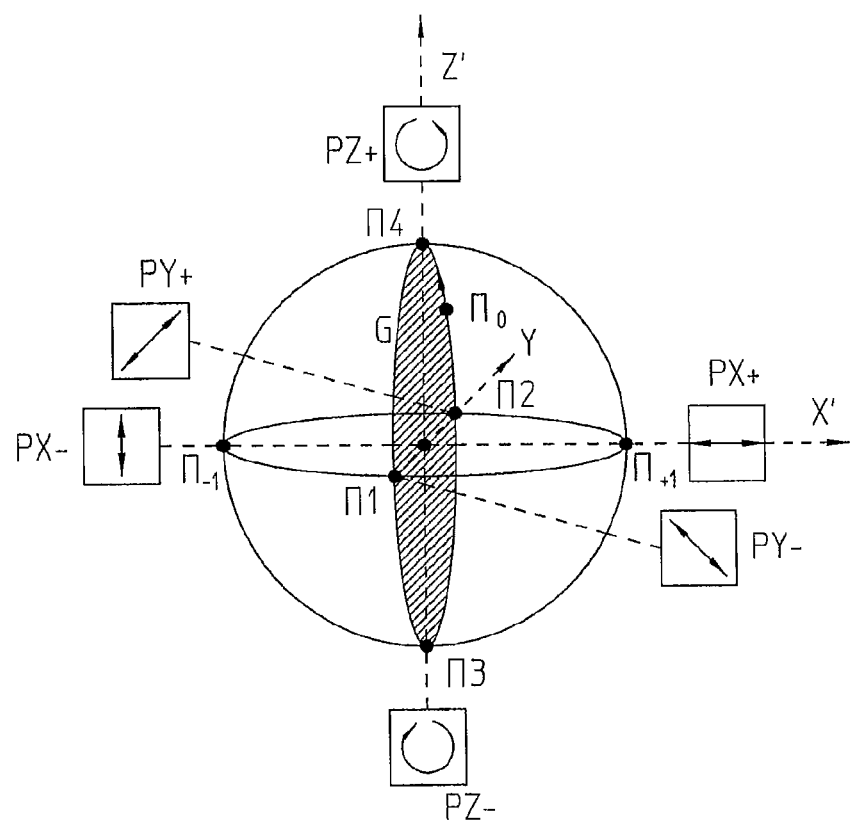
FIG. 2 shows the Poincaré representation for the known optical position measuring instrument of FIGS. 1a and 1b.
Figure 3A:
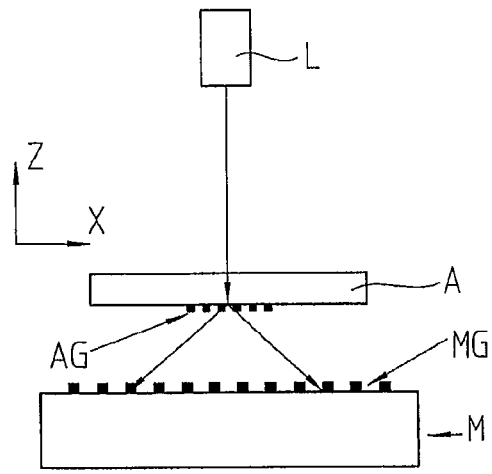
FIGS. 3a and 3b show various portions of the scanning beam path of a second embodiment of an optical position measuring instruments in the prior art.
Figure 3B:
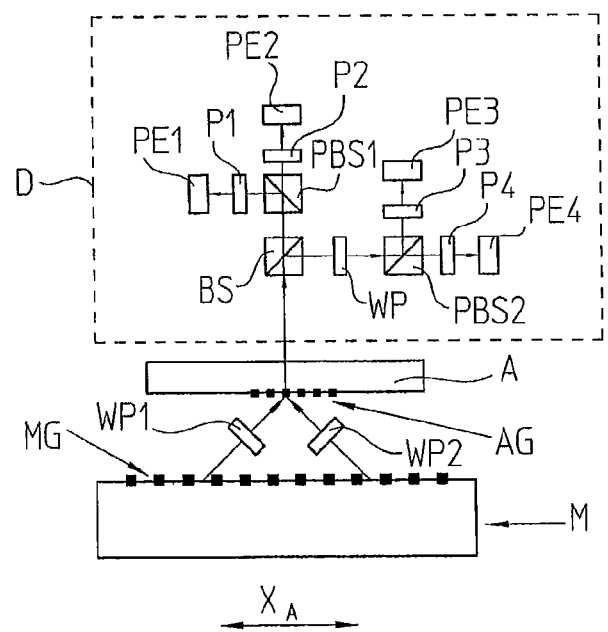
Figure 4:
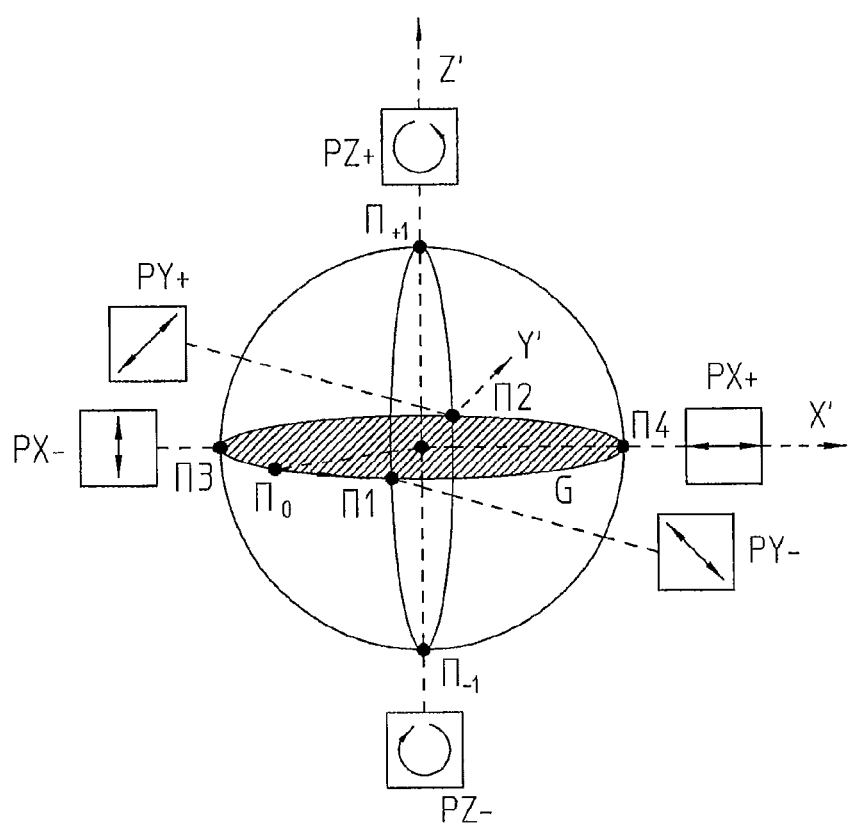
FIG. 4 shows the Poincaré representation for the known optical position measuring instrument of FIGS. 3a and 3b.
Figure 6A:
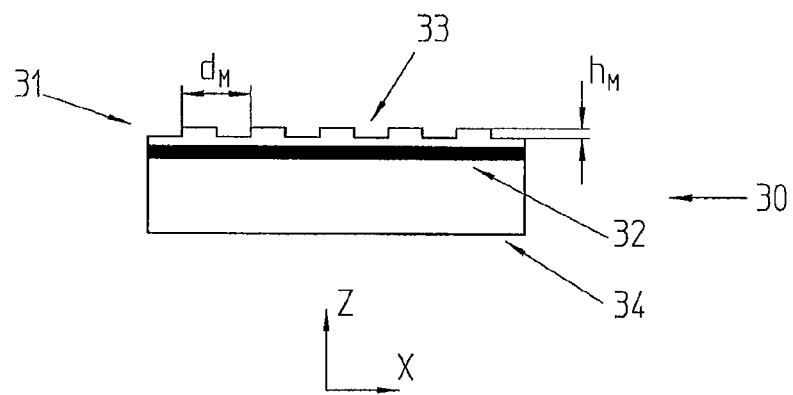
FIGS. 6a and 6b show respectively a sectional view of an embodiment of a scale and a top view on an embodiment of a reflector of the scale of the optical position measuring instrument of FIGS. 5a and 5b.
Figure 6B:
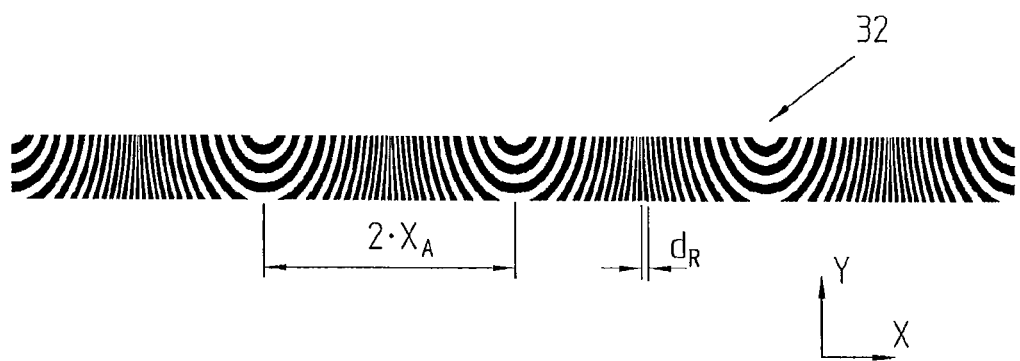
Figure 7:
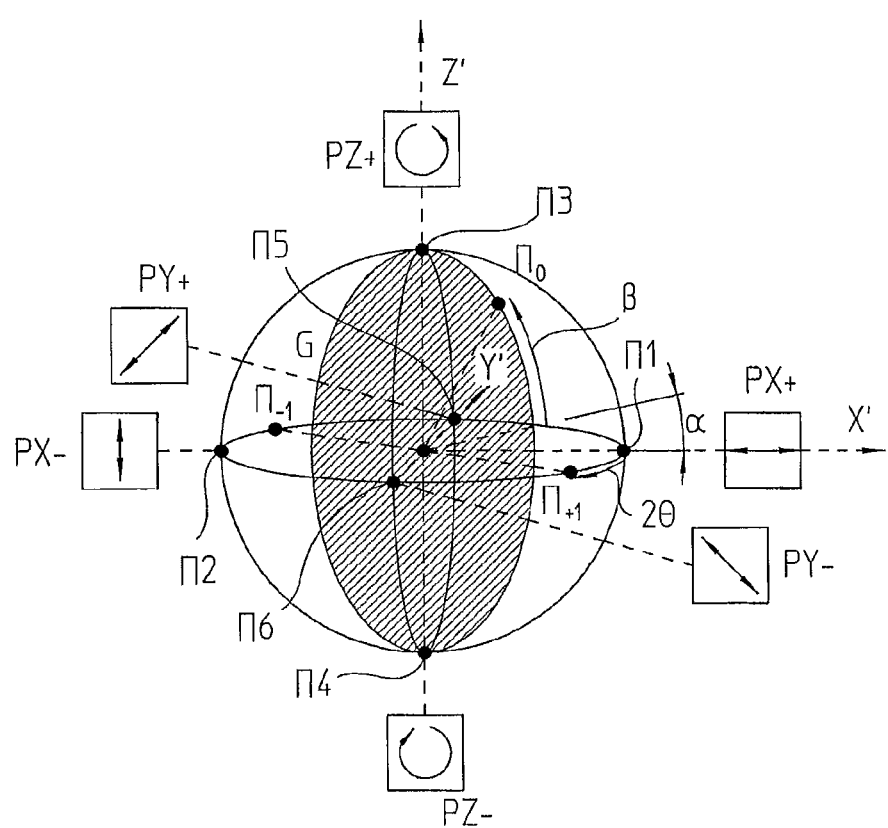
FIG. 7 shows a Poincaré representation for the optical position measuring instrument of FIGS. 5a-6b.

A first exemplary embodiment of the optical position measuring instrument of the present invention will be described below in conjunction with FIGS. 5a, 5b, 6a, 6b and 7. FIGS. 5a and 5b show the scanning beam path of a first embodiment of the optical position measuring instrument of the present invention in various views. FIGS. 6a, 6b show a sectional view of the scale and a top view on the reflector of the scale of the first embodiment of the optical position measuring instrument of the present invention. FIG. 7 is the Poincaré representation for the first embodiment of the optical position measuring instrument of the present invention.

In FIGS. 5a (scanning beam path as far as the scale 30) and 5b (beam path from the scale 30 on), the scanning beam path of an optical position measuring instrument of the present invention is shown that is embodied as a so-called Littrow encoder. This means that a beam of a collimated light source 10 that strikes a first grating, in the form of a scanning grating 21, perpendicularly to the measuring direction X is split into two symmetrical partial beams, which propagate to a scale grating 31. From the scale grating 31, the two partial beams are each diffracted back in the opposite direction, so that upon another diffraction the partial beams are colinearly superimposed at the scanning grating 21. Viewed in the measuring direction, the beam inclinations of the partial beams striking the scale grating 31 match those of the diffracted partial beams.

By way of the optical position measuring instrument of the present invention, the relative position of a scanning plate 20 and a scale 30, which are disposed displaceably counter to one another at least in the indicated measuring direction X, to one another can be determined. It is possible here for the scanning plate 20, together with further components, such as a light source 10 and a detection unit 40, to be disposed in a scanning unit—not shown. The scanning plate 20 or scanning unit on the one hand and the scale 30 on the other are connected to two objects movable relative to one another, whose relative position is to be determined, such as two machine parts displaceable relative to one another. Via the optical position measuring instrument of the present invention, in the event of relative motion of these objects, displacement-dependent scanning signals in the form of periodic incremental signals are generated and made available to a downstream electronic unit for further processing.

The collimated and unpolarized beam of the light source 10 is split at a first grating, embodied as a transmissive scanning grating 21, with a graduation period $d_A$ at the scanning plate 20, initially into $+1^{st}$ and $-1^{st}$ order of magnitude partial beams. These partial beams are then propagated in the direction of a scale grating 31 on the scale 30, where they strike one another at the target sites $Q_{-1}$, $Q_{+1}$ with the beam spacing $X_A$. The scale grating 31 extends in the measuring direction X and has the graduation period $d_M = d_A/2$. Via the scale grating 31, the incident partial beams are diffracted reflectively in the $-1^{st}$ and $+1^{st}$ order of magnitude; that is, the diffracted partial beams thus travel in the opposite direction back, so that they strike the scanning grating 21 again on the underside of the scanning plate 20. There, both partial beams are superimposed by renewed diffraction in the $+1^{st}$, $-1^{st}$ and, in the $0^{th}$ resultant order of diffraction, they exit, reunified, as a resultant beam. Finally, the resultant beam is delivered to the detection unit 40, which generates displacement-dependent phase-shifted scanning signals S1-S6.

Since the two partial beams are spatially separated only at the location of the scale 30 or scale grating 31, the scale grating 31 according to the present invention has locally different polarization properties for the partial beams striking it at the target sites $Q_{+1}$ and $Q_{-1}$. Thus, in the present exemplary embodiment, at the site $Q_{+1}$, the scale grating 31 polarizes in the X direction, while at the site $Q_{-1}$, a polarization in the Y direction results. This means that the partial beam diffracted at the site $Q_{+1}$, after the diffraction, has a linear polarization in the X direction, and that the partial beam diffracted at the site $Q_{-1}$, after the diffraction, has a linear polarization in the Y direction. In this manner, the two incident partial beams are thus polarized orthogonally to one another. If the scale 30 is now displaced by the beam spacing $X_A (>> d_M)$, or in other words for the displacement amount $\Delta X_M$ of the scale 30 in the direction X, it is then true that $\Delta X_M = X_A$, then the partial beam deflected by the $+1^{st}$ order of magnitude at the scale grating 31 strikes the scale grating 31 at the site $Q'_{+1} = Q_{-1}$, so that there it is polarized in the Y direction. So that both partial beams again have an orthogonal polarization to one another, the scale grating 31 must polarize in the X direction at the site $Q'_{-1}$. The scale grating 31 must therefore be polarized in alternation in the X and Y directions at the beam spacing $X_A$. So that this condition regarding the orthogonality of the polarization direction of the diffracted partial beams will also be met at the intervening sites, the scale grating 31 thus has a polarization direction $\Theta(x)$ that is periodically dependent on the site X:

$$\Theta(X) = (\pi/2) \cdot (X/X_A) \quad \text{(Equation 1)}$$

The polarization directions of the two partial beams polarized at the scale grating 31 are thus always perpendicular to one another:

$$\Theta(X+X_A) = \Theta(x) + \pi/2 \quad \text{(Equation 2)}$$

Having the polarization directions always be perpendicular to one another in the split partial beams is accordingly accomplished in a manner not as described in the prior art, by separate polarization-optical components in the beam path between the scanning plate 20 and the scale 30, which establish a constant polarization in each of the partial beams. Instead, according to the present invention, by way of suitably embodied polarizers, polarization states in the split partial beams are established that are variable along degrees of freedom of the scale, preferably periodically with a defined polarization period $P_P$ of the respective polarizer. It is always ensured here that both partial beams have an orthogonal polarization to one another, or in other words that the polarization states of the two partial beams are always oriented orthogonally to one another. In the present first exemplary embodiment, certain elements of a suitably embodied scale grating 31 or suitably scale 30 function as a polarizer, which take on this function.

An exemplary embodiment of a scale 30 suitable for this purpose, with a corresponding scale grating 31, is shown in FIG. 6a (in cross section) and FIG. 6b (in top view on reflector 32). The scale 30 includes a substrate 34, on which a scale grating 31 is applied, wherein the scale grating 31 includes a structured, dielectric layer 33 and a structured reflector 32. Such a scale is called a so-called reflection scale. The dielectric layer is structured in lands with the periodicity or graduation period $d_M$. The land height $h_M$ of the dielectric layer 33 is dimensioned such that an optical phase shift of 180° occurs between the wave exiting at the land and the wave exiting at the groove. The lands and grooves in the dielectric layer 33 are virtually of equally width. The reflector 32 includes a metal layer, such as aluminum, silver, or gold, which is structured locally with a grating constant $d_R < \lambda/2$, in which $\lambda$ indicates the wavelength of the light source 10. In this exemplary embodiment, the reflector 32 is thus embodied as a polarizing high-frequency grating. A high-frequency grating of this kind has only a $0^{th}$ order of magnitude and acts like a polarizer on the partial beams striking it, and the polarization direction of the partial beam reflected from it agrees with the linear direction of the high-frequency grating at the target site. The high-frequency gratings in this embodiment accordingly function as a polarizer provided according to the present invention. The grating orientation of the high-frequency grating varies periodically in the measuring direction X or the scale extension direction at least approximately in accordance with Equation 1 above. At a distance of $2 \cdot X_A$, the grating orientations again match each other. The distance $2 \cdot X_A$ will hereinafter be called the polarization period $P_P$. The combination, in terms of the scale, of the structured, dielectric layer 33 and the structured reflector 32, which combination the final analysis embodies the scale grating 31, thus acts like a phase grating with a suppressed $0^{th}$ order of magnitude, while the $+1^{st}$ and $-1^{st}$ orders of magnitude are polarized differently as a function of location. By way of the action of the polarizer—or of the high-frequency grating in the present exemplary embodiment—on the partial beams, respective linear polarization states in the partial beams thus result that vary in their orientation as a function of location. Thus, the high-frequency grating acts locally on each of the incident partial beams like a linear polarizer.

In contrast to the polarizing scale gratings known from U.S. Pat. No. 6,914,234 mentioned at the outset, in the present invention the graduation period $d_M$ of the scale grating, or the graduation period $d_A$ of the first grating, that is, of the scanning grating 21, does not match the polarization period $P_P = 2 \cdot X_A$; instead, the following is true: $d_M << 2 \cdot X_A$ and $d_A << 2 \cdot X_A$. Typical values for the graduation period $d_M$ and the polarization period $P_E = 2 \cdot X_A$ are approximately $d_M = 1, \ldots, 10 \mu m$ and $2 \cdot X_A = 0.5, \ldots, 5 mm$; $d_A$, in accordance with the relationship given above, would then be approximately in the range of $d_A=2, \ldots, 20$ μm. For the ratio of the polarization period $P_P$ to the graduation period of the first grating—in the present example, the scanning grating 21—it is accordingly true that $P_P/d_A>100$. If, as in an exemplary embodiment to be described below, the scale grating with the graduation period $d_M$ functions as a first grating with a splitting function, then analogously, $P_P/d_M>100$. Thus, according to the present invention, the polarization period $P_P$ of the polarizer is always greater than the graduation period of the respective first grating. By such a choice of the ratio between the polarization period $P_P$ of the polarizer and the graduation period of the first grating is it possible to embody a very high-resolution optical position measuring instrument, since the extent of the beam no longer needs to be selected as less than the graduation period $d_M$ of the scale grating 31, but instead now merely has to be less than the polarization period $P_P=2 \cdot X_A$.

The polarization states $\Pi_{-1}$ and $\Pi F_{+1}$ of the two partial beams can, for the first exemplary embodiment of the optical position measuring instrument of the present invention as well, be represented clearly as points on the Poincaré sphere, as can be seen from FIG. 7. Because of the reflector structure described above, these polarization states are always linear and orthogonal polarization states and are thus represented diametrically opposite one another in the X'Y' plane (equatorial plane). As a function of the scale displacement $\Delta X_M$, they move along the equatorial circle. The angle between the polarization state $\Pi_{+1}$ and the X' axis is $2\Theta$ $(\Delta X_M)$. Both polarization states $\Pi_{-1}$ and $\Pi_{+1}$ traverse the entire equatorial circle upon a scale displacement of $\Delta X_M=2 \cdot X_A$; that is, after a displacement by the polarization period $2 \cdot X_A$ of the scale grating 31, the same polarization state thus again prevails.

Upon a scale displacement by the displacement amount $\Delta X_M$, the two partial beams experience a phase shift relative to one another because of the locally different diffraction at the scale grating 31. For the diffraction present here of the $+1^{st}$ and $-1^{st}$ orders, the resultant phase displacement is $$\Delta\Phi(\Delta X_M)=2*(2\pi/d_M)*\Delta X_M=(2\pi/SP)*\Delta X_M \quad \text{(Equation 3)}$$

The magnitude $SP=d_M/2$ here indicates the signal period of the optical position measuring instrument of the invention.

The superposition of the two partial beams to make the resultant beam exiting with the $0^{th}$ order of magnitude furnishes a polarization state $\Pi_0$ with the angular positions $\alpha$, $\beta$ relative to the center point of the Poincaré sphere in the planes indicated. The polarization state $\Pi_0$, or the corresponding point, is located on the Poincaré sphere on a great circle G which is perpendicular to the connecting line of the generating polarization states $\Pi_{-1}$ and $\Pi_{+1}$ of the two partial beams. The angular position $\alpha$ of the great circle G is therefore indicated by $$\alpha=2*\Theta(\Delta X_M)-\pi/2=\pi*(\Delta X_M/X_A)-\pi/2 \quad \text{(Equation 4)}$$

The angular position $\beta$ of the point $\Pi_0$ within the great circle G is determined as follows by the phase displacement $\Delta\Phi(\Delta X_M)$ as follows:

$$\beta=\Delta\Phi(\Delta X_M) \quad \text{(Equation 5)}$$

Upon a phase change $\Delta\Phi=2\pi$, the polarization state $\Pi_0$, or the corresponding point, passes precisely once through the great circle G.

Upon a continuous motion of the scale 30, both the angular position $\alpha$ of the great circle G and the angular position $\beta$ along the great circle G change. However, the change in the angular position $\beta$ proceeds very much faster than that of the angular position $\alpha$, since the signal period SP is very much shorter than the polarization period $P_P=2 \cdot X_A$ of the scale grating 31. Typical values for the signal period SP and the polarization period $P_P=2 \cdot X_A$ d are SP=0.5, ..., 5 μm and $2 \cdot X_A \neq 0.5, \ldots, 5$ mm. Upon a continuous motion of the scale 30, the polarization state $\Pi_0$ therefore moves rapidly along the great circle G, and this great circle G rotates slowly about the vertical axis Z' (connecting line of the circular polarization states). The great circle G is therefore also called the local polarization state plane.

The detection unit 40 and the ensuing signal evaluation are now constructed such that the angular position $\beta$ can be determined with a high resolution $\delta\beta$. This ensures a high position resolution $\delta\xi=SP*(\delta\beta/2\pi)$ of the optical position measuring instrument of the present invention (fine position). In some cases, however, it can also be advantageous to determine the angular position $\alpha$ simultaneously. This furnishes an item of information about a coarse position, and the coarse position is absolute, within the polarization period $2 \cdot X_A$. As is known with absolute position measuring instruments operating by the multifrequency method, such a coarse position can be used for calculation with the fine position to generate a position value of high resolution that is unambiguous within $2 \cdot X_A$. Optionally, additional graduation lines can also be applied to the scale 30 and scanned, to increase the certainty of the calculation and/or to widen the range of unambiguity of the position determination. In this way, absolute position determination can be done.

One exemplary embodiment of a detection unit 40 for the optical position measuring instrument of the invention is shown in FIG. 5b. A splitting grating 41, disposed on the inlet side therein, splits the incident resultant beam into six detection beams. These strike the polarizers 42.1-42.6 before they are converted, by corresponding optoelectronic detector elements 44.1-44.6, into the displacement-dependent scanning signals S1-S6. The polarizers 42.3 and 42.4 are preceded by $\lambda/4$ retardation plates 43.3 and 43.4, respectively, in order to convert left- and right-circular polarization of the incident detection beams into linear polarizations. The polarization axes of the polarizers 42.1, 42.2, 42.5 and 42.6 are at an angle of 0°, 90°, 45°, and 135°, respectively, to the X direction. The polarization states $\Pi1, \Pi2, \ldots, \Pi6$ detected by the optoelectronic detector elements 44.1-44.6 are designated as follows in the Poincaré representation in FIG. 7:

44.1: $\Pi1=PX+$
44.2: $\Pi2=PX-$
44.3: $\Pi13=PZ+$
44.4: $\Pi4=PZ-$
44.5: $\Pi5=PY+$
44.6: $\Pi6=PY-$

The optoelectronic detector elements 44.1-44.6 thus unambiguously detect every arbitrary polarization state $\Pi1, \Pi2, \ldots, \Pi6$ on the Poincaré sphere. In each axial direction X', Y', Z', corresponding signals are formed:

X': S1, S2
Y': S5, S6
Z': S3, S4

Thus, via the detection unit 40 of the optical position measuring instrument of the invention, every arbitrary polarization state in the resultant beam can be detected unambiguously in the three directions in space in the Poincaré sphere. This ensures the complete detection of every arbitrary polarization state in the resultant beam. To that end, the detection unit 40 includes at least three detector elements that detect two linear and one circular polarization state, wherein the two linear polarization states are not oriented orthogonally to one another.

In contrast to this, in position measuring instruments of the prior art, only polarization states which are located on a fixed great circle G are generated and unambiguously detected by optoelectronic detector elements. The polarization states that are associated with the detector elements are accordingly located on that great circle. Polarization states on both sides of the great circle plane are not detected by their own detector elements and therefore also cannot be distinguished from one another unambiguously. This applies particularly to the two generating polarization states $\Pi_{-1}$ and $\Pi_{+1}$. In the prior art, only a two-dimensional polarization state in the plane of the great circle G is detected, while the detection unit 40 of the position measuring instrument of the present invention detects a three-dimensional polarization state.

For that purpose, the detection unit 40 generates six scanning signals, since besides the AC signal portions, DC signal portions are also detected, and these have to be eliminated by subtraction. In doing so, care must be taken that the signal pairs S1, S2; S3, S4; and S5, S6 each furnish so-called push-pull signals, since they detect diametrically opposed polarization states in the Poincaré representation. The AC signals $S_X$, $S_Y$ and $S_Z$, which are associated with the axes X', Y', Z' of the Poincaré sphere, are therefore formed by the following:

$$S_X = S1 - S2 \quad \text{(Equation 6.1)}$$

$$S_Y = S5 - S6 \quad \text{(Equation 6.2)}$$

$$S_Z = S3 - S4 \quad \text{(Equation 6.3)}$$

The ensuing signal evaluation has the goal of determining the angular positions α and β. From a geometrical evaluation of the Poincaré representation, the following relationships are found:

$$\beta = \arctan 2(S_Z, S_\alpha) \quad \text{(Equation 7)}$$

in which $$S_\alpha = S_X * \cos(\alpha) + S_Y * \sin(\alpha) \quad \text{(Equation 8)}$$

and $$\alpha = \arctan 2(S_Y, S_X) + m * \pi \quad \text{(Equation 9)}$$

The variable m in Equation 9 can assume the value of 0 or 1. Since the sign of Sα changes upon a change in the value of m, and thus the measuring direction of the optical position measuring instrument of the present invention is inverted, it is advantageous to employ Equation 9 only upon initialization. The reason for this ambiguity is that normally it is known which side of the great circle G (local polarization state plane) the polarization state $\Pi_{+1}$ is located on. A transposition of the two polarization states $\Pi_{-1}$ and $\Pi_{+1}$, as happens upon a displacement by the displacement amount $X_A$, produces the same great circle G.

From the angular position β thus determined, the fine position ξ of the optical position measuring instrument of the invention can finally be determined:

$$\xi = (SP/2\pi) * \beta + N * SP \quad \text{(Equation 10)}$$

Here, N designates the value of an incremental counter, and in a known manner it counts the number of signal periods traversed. With the aid of the final position ξ, the angular position α can in turn be determined analogously to Equation 4:

$$\alpha = \pi * (\xi / X_A) - \pi C/2 \quad \text{(Equation 11)}$$

After the initialization, it is advantageous to calculate the angular position α in accordance with Equation 11, instead of Equation 9, since Equation 11 furnishes unambiguous values. However, this does not prevent the measuring direction from not being unambiguously defined upon the initialization and from depending on the choice of the parameter m.

An unambiguous choice of the value m upon initialization can be ensured in various ways. For one, during the initialization small positive (or negative) position displacements can be generated with the aid of the associated actuator and measured by the optical position measuring instrument of the present invention. From the change in the position values, m can be determined such that the measuring direction becomes correspondingly positive (or negative). With a positive measuring direction, it is necessary for instance in accordance with Equations 7-9 for Sα to increase if $S_Z<0$ and decrease if $S_Z>0$. As mentioned above, the sign of Sα is fixed by the choice of m.

Figure 8A:
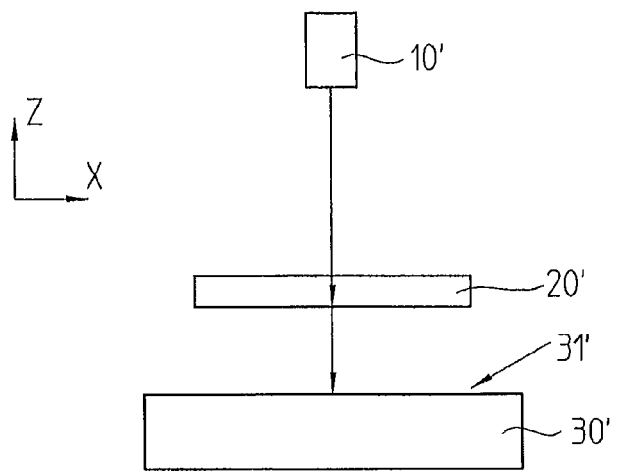
FIGS. 8a and 8b show various portions of a possible scanning beam path of a second embodiment of an optical position measuring instrument in accordance with the present invention.
Figure 8B:
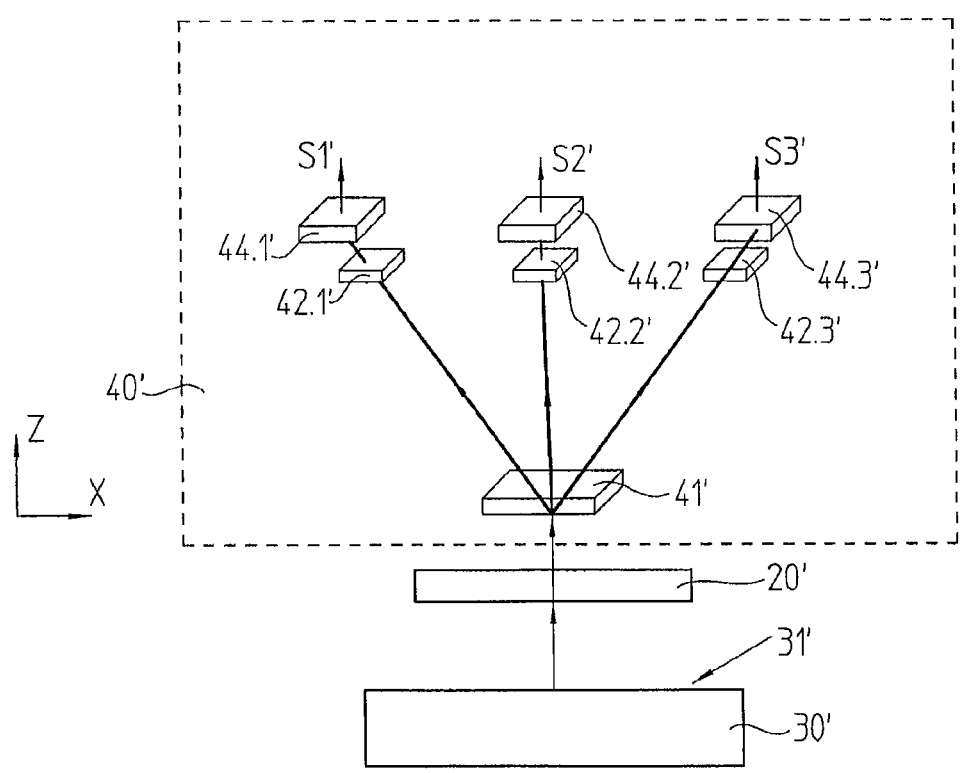

Alternatively, additional signals can also be generated for determining the angular position α. In the variant of the first exemplary embodiment shown in FIG. 8a (beam path as far as scale 30') and FIG. 8b (beam path from scale 30' on), a nonpolarized or circularly polarized beam from a light source 10' can be deflected onto the scale 30' having the scale grating 31' described above. The beam linearly polarized by the reflector—not shown—and returning with the 0th order of magnitude reaches a detection unit 40'. In the detector unit 40', the beam is split by a splitting grating 41' into three detection beams and, after transmission through the polarizers 42.1'-42.3', is detected by optoelectronic detector elements 44.1'-44.3'. The polarization axes of the polarizers 42.1'42.3' are at an angle of 60° each from one another. The derived signals S1', S2' and S3' represent incremental signals with a mutual phase displacement of 120° and a signal period of $2 \cdot X_A$, which corresponds to the polarization period of the scale 30'. From that, an incremental position ξ' can be determined in a known manner, so that with the aid of Equation 11, the angular position α can be calculated unambiguously.

A second exemplary embodiment of the optical position measuring instrument of the present invention will now be explained in conjunction with FIGS. 9a-9c, 10a, 10b, and 11. Here, the inventive principles are used in a position measuring instrument of the kind proposed for instance in International Patent Disclosure WO 2008/138501 A1 or in WO 2008/138502 A1, both of the present Applicant. Note that WO2008/138501A1 and WO2008/138502A1 correspond to U.S. Pat. Nos. 7,796,272 and 7,907,286, the entire contents of each of which are incorporated herein by reference. The particular advantage of such position measuring instruments is that the XY position of a table that is displaceable in the X and Y directions can be measured especially accurately while obeying the Abbe condition.

Figure 9A:
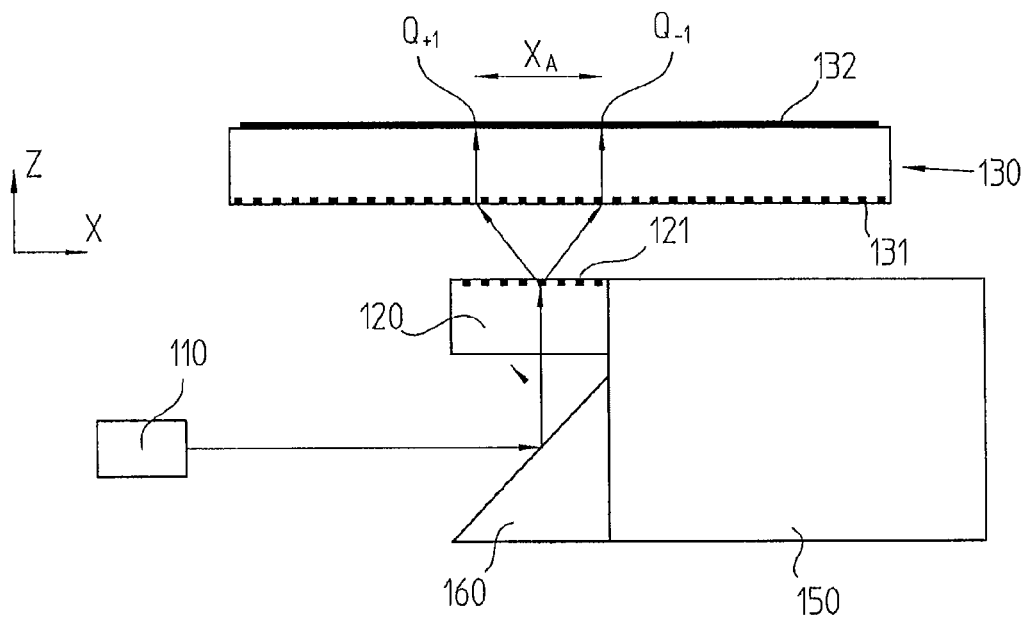
FIGS. 9a, 9b, and 9c show various paths and views of a possible scanning beam path of a third embodiment of an optical position measuring instrument in accordance with the present invention.
Figure 9B:
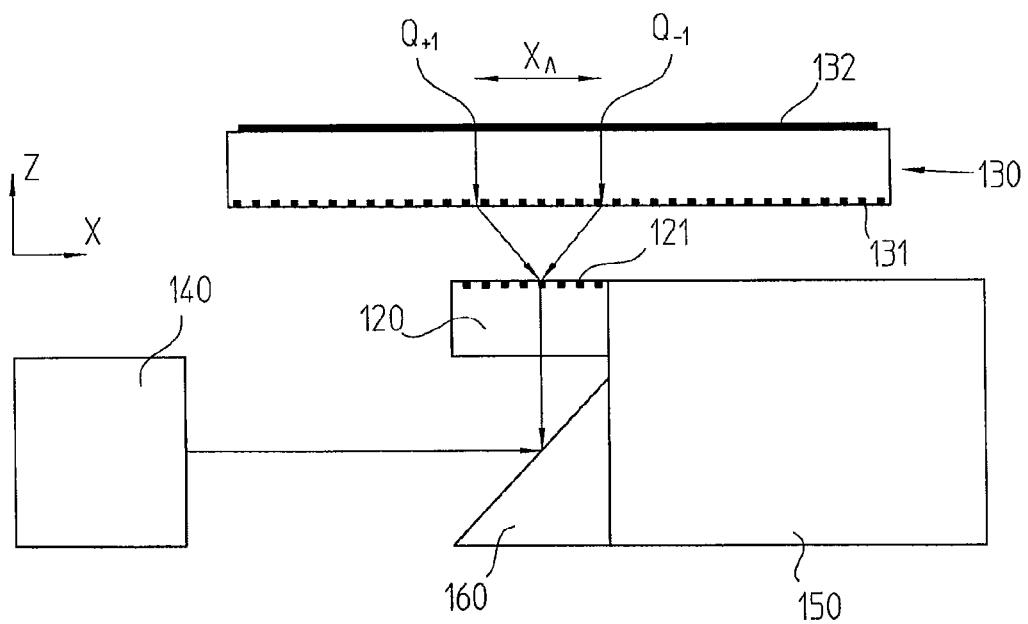
Figure 9C:
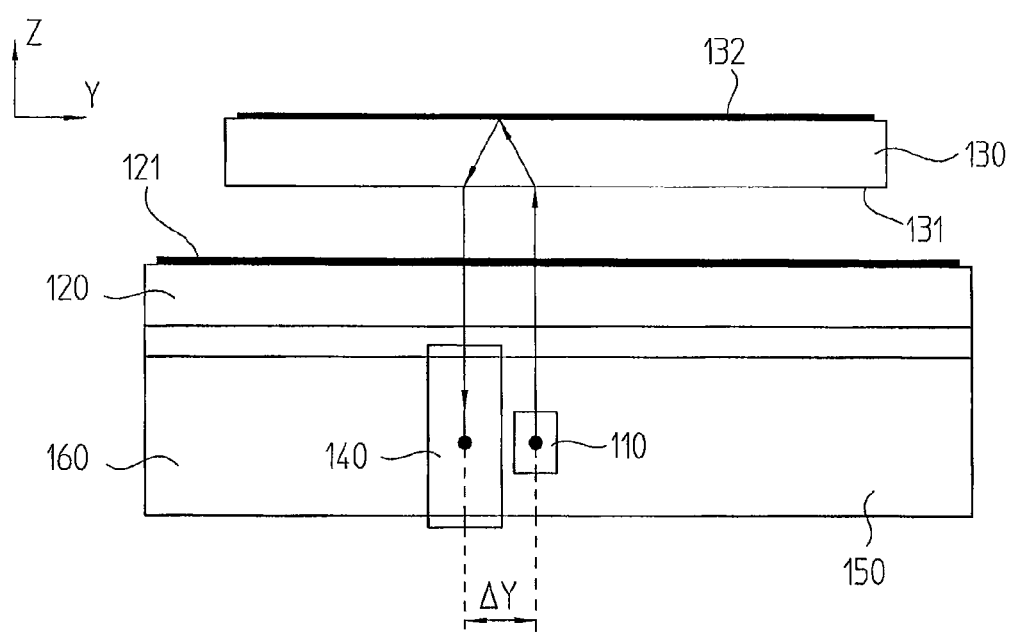

In the beam path views in FIGS. 9a-9c, the corresponding optical position measuring instrument includes a scale 130, which is connected in fixed fashion to a stationary tool (such as a microscope), and a scanning rod or scanning plate 120, which is mounted on one side face of a table 150. At the overlapping face of the scale 130 and the scanning plate 120, a nonpolarized or circularly polarized beam from a collimated light source 110 enters, which is deflected by a deflection mirror 160 at the side face of the table 150 into the Z direction indicated. The deflected beam is split at a first grating, in the form of a scanning grating 121, on the top side of the scanning plate 120, into partial beams of the $-1^{st}$ and $+1^{st}$ orders of magnitude. Both partial beams strike the scale grating 131 of the scale 130, which is shown here as a transmission phase grating with a 180° phase deviation. The structure of the scale grating 131 is shown in FIG. 10b in a top view on the scale 130. The scale grating 131 includes a superposition of a periodic grating structure with a splitting direction in the X direction and a diffractive cylinder lens with a focusing effect in the Y direction. The periodic grating structure effects a deflection of the partial beams, inclined in the X direction, backward, so that after the diffraction they propagate in the Z direction (optical axis). Simultaneously, however, the diffractive cylinder lens focuses both partial beams in the Y direction, so that their focus is at the back side of the scale 130. At the back side of the scale 130, the partial beams focused in the Y direction are reflected by a structured reflector 132, which is embodied analogously to the first exemplary embodiment. The reflector 132 linearly polarizes the two partial beams orthogonally to one another; in the present example as well. Thus, a high-frequency grating functions according to the present invention as a polarizer in the beam path of the two partial beams. The polarization period of the reflector 132 again corresponds to twice the value of the spacing $X_A$ of the partial beams on the scale 130 or on the scale grating 131. Because of the Y offset of the partial beams relative to the center of the diffractive cylinder lens, the two partial beams, offset by ΔY in the Y direction, again strike the scale grating 131. There, they are collimated again and deflected in the X direction such that they are superimposed by the scanning grating 121 of the scanning plate 120 and exit in the −Z direction. After the deflection at the deflection mirror 160, the partial beams reach a detection unit 140. The detection unit 140 with the six optoelectronic detector elements 144.1-144.6, as in the first exemplary embodiment, generates six scanning signals S1-S6, which correspond to the various polarization states 111-116:

144.1: Π1=PX+
144.2: Π2=PX−
144.3: Π3=PY+
144.4: Π4=PY−
144.5: Π5=PZ+
144.6: Π6=PZ−

Figure 11:
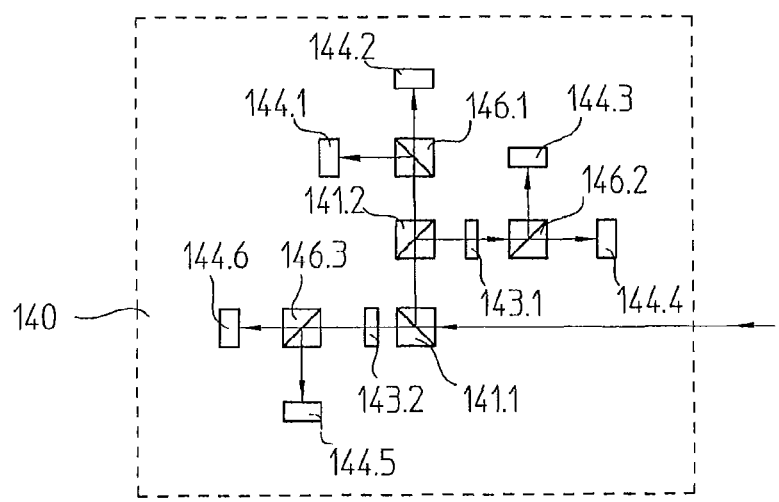
FIG. 11 is a schematic illustration of an embodiment of a detection unit of the optical position measuring instrument of FIGS. 9a-10b in accordance with the present invention.

However, in this exemplary embodiment, the six detection beams in the detection unit 140 of FIG. 11 are split by non-polarizing beam splitters 141.1, 141.2 and polarizing beam splitters 146.1, 146.2, 146.3. The polarizing beam splitter 146.1 splits the corresponding linear polarizing components of the incident resultant beam to the optoelectronic detector elements 144.1, 144.2. The λ/2 retardation plate 143.1 rotates the incident linear polarization components by 45°, so that the detector elements 144.3 and 144.4 correspondingly detect the polarization components rotated by ±45°. A λ/4 retardation plate 143.2 in combination with the polarizing beam splitter 146.3 has the effect that the detector elements 144.5 and 144.6 detect circularly polarized light components of the incident resultant beam. Thus, the action of this detection unit 140 is equivalent to that of the preceding exemplary embodiment.

The signal evaluation is likewise done analogously to the first exemplary embodiment.

The special advantage of this version of the optical position measuring instrument according to the present invention is that only one resultant beam has to be directed to the detection unit 140, and it cannot be converted by the polarization coding into phase-shifted detection beams and corresponding scanning signals S1-S6 until the detection unit 140. In prior-art scanning optics of such position measuring instruments, either a scanning unit had to be moved along with a direction of motion of the table, or, by the gratings of the scale and of the scanning plate, a plurality of resultant beams were already formed which then had to be directed to the detection unit by long, precise individual mirrors or deflection gratings. Both of these entailed very great expense.

Moreover, small particles in the air path from the deflection mirror 160 to the detection unit affect all the scanning signals S1-S6 equally, so that the DC signal components (direct current signal components) are still precisely eliminated by the subtraction of Equation 6. The consequence is a very slight interpolation error.

Figure 12:
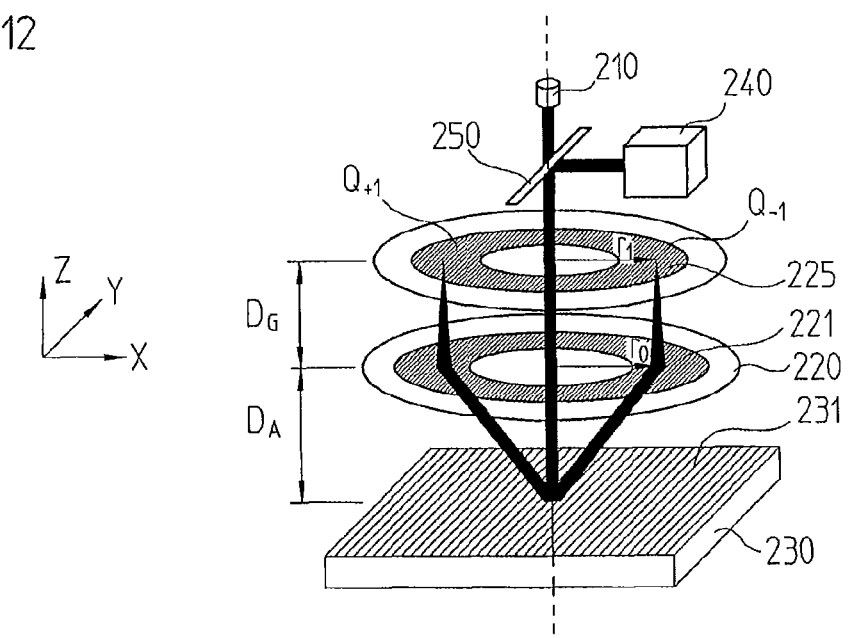
FIG. 12 is a schematic illustration of a possible scanning beam path of a fourth embodiment of an optical position measuring instrument in accordance with the present invention.
Figure 13A:
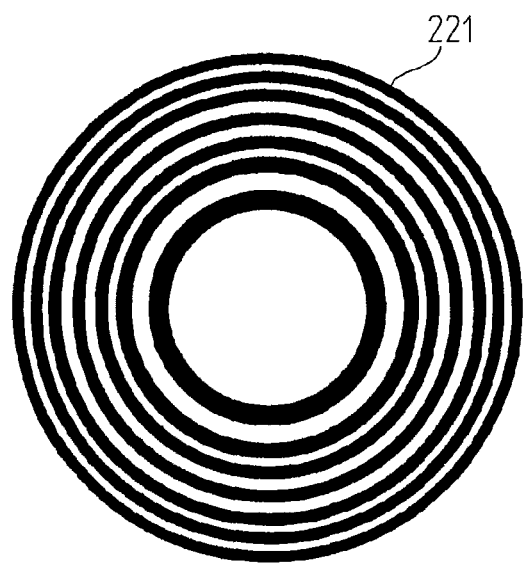
FIGS. 13a and 13b are respectively a top view on an embodiment of a scanning grating and a top view on an embodiment of a reflector to be used with the optical position measuring instrument of FIG. 12.
Figure 13B:
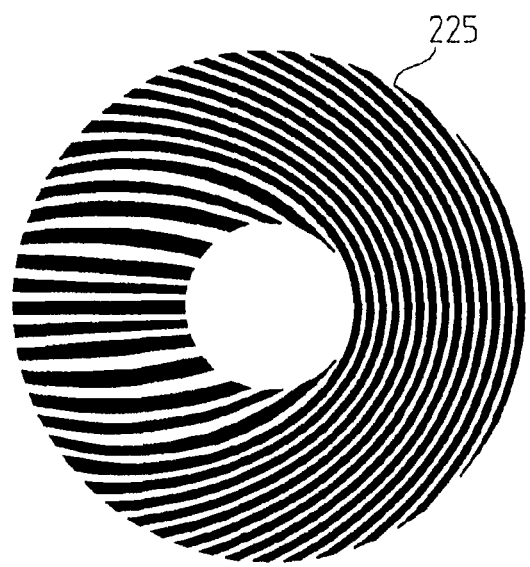

A third exemplary embodiment of the optical position measuring instrument of the present invention is shown in FIGS. 12, 13a, 13b and will be described below. Once again, only the definitive differences from the exemplary embodiments above will be discussed.

A scale 230 with a linear scale grating 231 is scanned by a virtually rotationally symmetrical scanning unit. The scanning unit here includes the remaining components shown in FIG. 12, namely a light source 210, a beam splitter 250, a scanning plate 220 with a scanning grating 221 and a reflector 225, and a detection unit 240.

As a result of the rotational symmetry, this scanning optics can scan the grating 231, without resultant positional errors, at any arbitrary angular position Rz (standing for rotation about the Z axis) of the scanning unit relative to the scale grating 231. A collimated beam of a nonpolarized or circularly polarized light source 210 is directed perpendicularly along the optical axis (−Z axis) to a first grating, namely the scale grating 231 of the scale 230. In this exemplary embodiment, the scale grating 231 thus functions as the first grating in the scanning beam path, which brings about a splitting of the beam, arriving from the light source 210, into two partial beams. The partial beams diffracted with a $+1^{st}$ and $-1^{st}$ order of magnitude and reflected then act upon a scanning grating 221. The scanning grating 221 has a rotationally symmetrical structure, as can be seen from the top view in FIG. 13a, and can be described by a parabolic grating phase $\Phi_{AG}(X,Y)$, in accordance with the following equation:

$$\Phi_{AG}(X,Y) = -[(\pi^* n_G)/(\lambda^* D_G)]^*(X^2+Y^2) \quad \text{(Equation 12)}$$

in which DG indicates the spacing in the Z direction between the scanning grating 221 and the reflector 225, and λ indicates the wavelength of the light source 210; nG is the index of refraction between the scanning grating 221 and the reflector 225.

The optimal spacing DG between the scanning grating 221 and the reflector 225 is determined by $$D_G = \frac{n_G}{\sqrt{1-(\lambda/d_M)^2}} \cdot D_A \quad \text{(Equation 13)}$$

in which DA indicates the spacing in the Z direction between the scanning grating 221 and the scale grating 231.

The parabolic grating phase $\Phi_{AG}(X,Y)$ describes a special lens action of the scanning grating 221, which is dimensioned such that the arriving partial beams are directed parallel to the optical axis Z, and simultaneously, focusing on the following reflector 225 takes place. Because of the rotational symmetry of the scanning grating 221, this effect is preserved even upon a rotation of the scanning grating 221 about the Z axis. The reflector 225 reflects the arriving partial beams in such a way that they take the same beam path back; that is, via the reflector 225. The result is a back-reflection in the direction of the scanning grating 221.

Both partial beams then act again on the scanning grating 221 and are collimated there again and deflected in the splitting direction of the scale grating 231. As a result of the diffraction at the scale grating 231, both partial beams are superimposed or reunited into the resultant beam. The resultant beam then travels along the optical axis (Z axis) back to a beam splitter 250, which delivers the resultant beam to a detection unit 240.

The polarization coding of the two partial beams, in this exemplary embodiment, is effected by an embodiment of the reflector 225 as a high-frequency grating, which is shown in a top view in FIG. 13b and is embodied in the form of a structured metal film. Thus, the reflector 225 embodied as a high-frequency grating functions as a polarizer. The partial beams reflected by the reflector 225 are each polarized linearly along the local grating lands. The structure of the reflector 225 is designed such that at opposed points $Q_{-1}$ and $Q_{+1}$, the grating lands are always orthogonal to one another. As a result, both partial beams are always linearly polarized orthogonally to one another. Accordingly, in this exemplary embodiment as well, a suitably embodied high-frequency grating functions as the polarizer. The grating phase $\Box_P(x,y)$ (also denoted $\Phi_P(X,Y)$ that is the basis of the high-frequency grating can be determined in accordance with the following equation:

$$\phi_P(x, y) = \frac{2\pi}{d_P} \cdot \left(r_1 + \sqrt{x^2 + y^2}\right) \cdot \sin\left(\frac{\arctan 2(y, x)}{2}\right), \quad \text{(Equation 14)}$$

in which the radius $r_1$ is the radial target site of the two partial beams on the high-frequency grating, and $d_P$ is the local grating constant of the high-frequency grating.

The detector unit 240 can be embodied as in the preceding exemplary embodiments, that is, approximately as shown in FIG. 5b or 11, and once again the detector unit 240 furnishes six signals S1-S6, which correspond to the above-described polarization states Π1, Π2, ..., Π6. The evaluation is done as in the first exemplary embodiment; the angular position α indicates the angle of rotation Rz of the scanning unit about the optical axis (Z axis).

The special advantage of the scanning optics of this embodiment of the optical position measuring instrument of the present invention resides in the unrestricted angle of rotation Rz of the scanning unit and scale, which is usually called the Moiré angle. Even upon a rotation by this angle of the scanning unit and scale, no position errors in the measurement result. In addition, given an optimal design of the grating phase $\Phi_{AG}(x,y)$, the other construction tolerances (Rx tilt, Ry tilt, z scanning spacing) are extremely wide.

The reflector 225 or the corresponding high-frequency grating, in the third exemplary embodiment described above locally has the action of a linear polarizer. It is moreover designed such that at the spacing of the two arriving partial beams, these local linear polarizers are orthogonal to one another. The initially unpolarized or circularly polarized partial beams are as a result polarized orthogonally to one another, so that the detection unit 240 furnishes scanning signals with maximum contrast. However, then half the radiation output of the partial beams is absorbed and is not available for signal generation. It is therefore more advantageous, in a modified variant of the third exemplary embodiment of the optical position measuring instrument of the present invention, to provide a circularly polarized light source and to select the high-frequency grating structure of the reflector such that the high-frequency grating acts locally like a retardation plate on the partial beams striking it, namely like a 2¼ retardation plate, whose primary axis is determined by the grating lands. As a result, the incident circularly polarized partial beams are converted into reflected linearly polarized partial beams with only slight losses in radiation output. Depending on the sign of the retardation, the linear polarization is at an angle of +45° or −45° to the grating lands. The orthogonality of the two partial beams is again achieved whenever the grating lands are perpendicular to one another at opposed target sites $Q_{-1}$ and $Q_{+1}$. The grating lands therefore again extend as in the exemplary embodiment in FIG. 13b. Only the local grating constant of the high-frequency grating as well as the land heights and widths and the grating materials used, preferably high-refraction layers, have to be suitably adapted. Over the polarization period $P_P = 2 \cdot X_A$, the grating lands and the local grating orientation rotate continuously by 180°.

In a further advantageous variant of the third exemplary embodiment of the optical position measuring instrument of the present invention, a linearly polarized light source is provided, and the high-frequency grating of the reflector is embodied such that it acts locally like a λ/2 retardation plate, whose primary axis again is determined by the grating lands. As a result, the linear polarization direction of the incident, linearly polarized partial beam is rotated in the polarization direction. The angle of rotation is equal to twice the value of the angle of rotation between the linear polarization direction of the incident partial beam and the orientation of the grating lands. At the target sites $Q_{-1}$ and $Q_{+1}$, the grating lands must each be at an angle of 45° to one another, so that the two exiting partial beams are polarized orthogonally to one another. Over the polarization period $P_P = 2 \cdot X_A$, the grating lands and in this case the local orientation rotate continuously by only 90°. It is naturally advantageous to rotate the grating lands in the adjacent polarization periods continuously by a further 90° each.

The design of the detection unit and the evaluation of the signals for this variant are identical to the above embodiments.

Besides the exemplary embodiments described thus far in concrete terms, it is understood that there are still further embodiment possibilities within the scope of the present invention. A number of such possible modifications will be indicated below.

In the exemplary embodiments described above of the optical position measuring instrument of the present invention, the polarization states $\Pi_{-1}$ and $\Pi_{+1}$ of the two interfering partial beams vary periodically with the defined change in position of the scale. Let this change of position be called the polarization-sensitive change of position, and it can be either a displacement or a rotation of the respective scale. The polarization-sensitive change in position need not match a change in position in the respective measuring direction.

In the second exemplary embodiment of the optical position measuring instrument of the present invention, the polarization-sensitive change in position can also refer to the scanning plate, if the scanning plate has the polarization-optical high-frequency gratings and if the two partial beams in the course of the beam path are separated at the location of the scanning plate. In such a variant, the roles of the scanning plate and scale are transposed.

In the exemplary embodiments described, the polarization states $\Pi_{-1}$ and $\Pi_{+1}$ are always located on the equator of the Poincaré sphere, that is, at the site of the linear polarization states, and move about the equator upon a polarization-sensitive change in location of the scale. In principle, it is also possible, within the scope of the present invention, to select the polarization of the light source and/or the local retardation action of the high-frequency grating reflector such that the polarization states of the partial beams are opposite one another at an arbitrary point in the Poincaré representation and move along an arbitrary trajectory upon a polarization-sensitive change in position of the scale. This trajectory can also include the polarization states +PZ and −PZ. The great circle, that is, the local polarization state plane, is—as described above—always perpendicular to the connecting line of the polarization states $\Pi_{-1}$ and $\Pi_{+1}$ and thus assumes corresponding orientations. By the detection unit, the polarization state of the resultant beam is unambiguously determined. The evaluation of the derived scanning signals naturally has to be adapted to the selected trajectory. To that end, the derived scanning signals are described as a function of the polarization state of the resultant beam, which in turn is described as a function of the various changes in position of the scale, and these equations are solved, as a function of the measured scanning signals, analogously to Equations 7-9 for the changes in position sought.

The polarization state of the resultant beam can occupy the entire spherical surface in the Poincaré representation, if sufficiently large changes in position of the scale are permitted. For that purpose, the detection unit must furnish a sufficient number of scanning signals. For distinguishing among the three directions in space of the Poincaré sphere, at least three detector elements are necessary, to which polarization states are assigned that are not allowed to be in the same plane in the Poincaré representation. Advantageously, additional detector elements are provided, which moreover enable the separation of the DC signal components from the modulated AC signal components (alternating current signal components). In the simplest case, one additional detector element can be used, whose assigned polarization state is opposite that of another detector element. Both detector elements thus furnish push-pull signals, from which, by addition, the DC signal component can be determined. This DC signal component is then subtracted from all the scanning signals, so that only the desired AC signal components remain and are further processed. In an optimal detection unit, however, six scanning signals in accordance with the above-described exemplary embodiments are provided, so that for direction in space of the Poincaré sphere, one pair of push-pull signals is generated. Naturally, it is also fundamentally possible to generate scanning signals for further polarization states, to increase the precision of the determination of the resultant polarization state and thus the precision of the interpolation. For instance, by one detector element without a preceding polarizer, a DC signal (direct current signal) can also be generated, which is subtracted accordingly from the signals of the other detector elements.

Moreover, in the second exemplary embodiment, it is naturally also possible to design the scale grating polarization-optically, instead of the reflector. Such an embodiment of a polarization-optical transmission grating can be obtained as a result, by selecting two variants of a high-frequency grating which each correspond to a λ/4 retardation plate and yet have a phase deviation of 180° from one another. These two variants are disposed in alternation in the structure in FIG. 10b (variant 1 is shaded and variant 2 is not shaded). Beyond the splitting direction X, the orientation of the high-frequency grating is varied such that at the beam spacing $X_A$, orthogonal polarizations again occur. In this case, the reflector is embodied as an unstructured reflection layer. Analogously in the third exemplary embodiment, the scanning grating 221 can also be replaced by a corresponding polarization-optical transmission grating. The two variants described above of a high-frequency grating are disposed in accordance with the structure in FIG. 13a. The orientation of the high-frequency grating rotates in the azimuthal direction in accordance with FIG. 13b. In this case, once again the reflector 225 is embodied as an unstructured reflection layer. In general, the orthogonal polarization of the two partial beams can be provided at any arbitrary point in the beam path of the position measuring instrument at which the two partial beams are locally separated.

Instead of the high-frequency grating, still other polarization-optical components can be used, such as plastic retardation plates or plastic polarizers, or layers with metal nanoparticles, for varying the polarization states of the two partial beams. The location dependency of the polarization properties can be brought about by a suitable location-dependent orientation of the polarization-optical elements, such as plastic molecules or nanoparticles.

Since the production of high-frequency gratings can be simplified substantially by means of certain peripheral conditions, such as uniform layer heights, etching depths, and layer materials, it is often advantageous for the two partial beams to be polarized not precisely orthogonally to one another, but instead to allow certain deviations from orthogonality. Sufficient degrees of modulation of the scanning signals are still also available for polarization states of the two partial beams that are offset in the Poincaré representation from one another in the range of 90°-270°, instead of the optimal 180° before The foregoing description is provided to illustrate the present invention, and is not to be construed as a limitation. Numerous additions, substitutions and other changes can be made to the present invention without departing from its scope as set forth in the appended claims.

I claim:

1. An optical position measuring instrument for detecting a relative position of a scale and a scanning plate, the optical position measuring instrument comprising:
    a scanning plate;
    a scale, wherein said scale and said scanning plate are movable relative to one another in a measuring direction;
    a grating that is assigned to either said scanning plate or said scale;
    a light source that emits a beam toward said grating, wherein said grating receives said beam and splits said beam into two partial beams, whose polarization states are oriented orthogonally to one another,
    a polarizer being integrated either in said scanning plate or in said scale and being arranged in beam paths of said two partial beams, wherein said polarizer comprises a structure to generate polarization effects on said two partial beams striking said polarizer that are periodically variable along degrees of freedom of motion of said scale, wherein a polarization period of said periodically variable polarization effects is greater than a graduation period of said grating;
    said two partial beams being reunified into a resultant beam after further interaction with said scanning plate or with said scale; and
    a detection unit that receives said resultant beam and generates a plurality of displacement-dependent scanning signals.

2. The optical position measuring instrument as defined by claim 1, wherein said detection unit has a structure such that, every arbitrary polarization state of said resultant beam is unambiguously detectable in three directions in space of a Poincaré sphere.

3. The optical position measuring instrument as defined by claim 1, wherein said detection unit comprises three detector elements, and said three detector elements detect two linear polarization states and one circular polarization state, wherein said two linear polarization states are not oriented orthogonally to one another.

4. The optical position measuring instrument as defined by claim 2, wherein said detection unit comprises three detector elements, and said three detector elements detect two linear polarization states and one circular polarization state, wherein said two linear polarization states are not oriented orthogonally to one another.

5. The optical position measuring instrument as defined by claim 1, wherein said polarizer acts on said two partial beams so that linear polarization states in said two partial beams result that are each varying in their orientation as a function of location.

6. The optical position measuring instrument as defined by claim 1, wherein said polarization states of said two partial beams are always oriented orthogonally to one another.

7. The optical position measuring instrument as defined by claim 1, wherein said polarizer has a structure such that a polarization action varying as a function of location on said two partial beams striking said polarizer is adjustable via spatially differently oriented components of said polarizer.

8. The optical position measuring instrument as defined by claim 1, wherein said polarizer is a high-frequency grating, which acts locally like linear polarizers on said two partial beams striking said linear polarizers.

9. The optical position measuring instrument as defined by claim 1, wherein said polarizer is a high-frequency grating, which acts locally like a retardation plate.

10. The optical position measuring instrument as defined by claim 1, wherein said grating is embodied as a scanning grating on said scanning plate, and said two partial beams split by said grating act on a scale grating on said scale and thereupon propagate in a direction toward said scanning grating at which said two partial beams are reunified into said resultant beam that is delivered to said detection unit.

11. The optical position measuring instrument as defined by claim 10, wherein said scale is a reflection scale, wherein said scale comprises:
a substrate;
a structured dielectric layer; and
said polarizer, wherein said polarizer is a structured reflector that is applied to said substrate, and said structured reflector is a polarizing high-frequency grating.

12. The optical position measuring instrument as defined by claim 1, further comprising a reflector, wherein said grating is embodied as a scale grating on said scale, and said two partial beams split by said grating act on a scanning grating on said scanning plate and thereupon propagate in a direction toward said reflector at which back reflection of said two partial beams in a direction toward said scanning grating results; and
wherein said two partial beams received by said scanning grating from said reflector propagate in a direction toward said scale grating at which said two partial beams are reunified into said resultant beam that is delivered to said detection unit.

13. The optical position measuring instrument as defined by claim 12, wherein said reflector is a high-frequency grating, whose local grating orientation rotates continuously by 180° over said polarization period.

14. The optical position measuring instrument as defined by claim 12, wherein said reflector is a high-frequency grating, whose local grating orientation rotates continuously by 90° over said polarization period.

15. The optical position measuring instrument as defined by claim 1, wherein for a ratio of said polarization period to a graduation period of said grating, the following equation applies:

$$P_P/d_A > 100$$

or $$P_P/d_M > 100,$$

where
$P_P$=polarization period of said polarizer,
$d_A$=graduation period of said grating,
$d_M$=graduation period of said polarizer.

* * * * *